US012715818B2

(12) United States Patent
Lin

(10) Patent No.: US 12,715,818 B2
(45) Date of Patent: Aug. 25, 2026

(54) METHOD FOR MANUFACTURING A SIC CERAMIC PART

(71) Applicant: JIAGENG (JIANGSU) SPECIAL MATERIALS CO., LTD., Taizhou (CN)

(72) Inventor: Jiaji Lin, Shenzhen (CN)

(73) Assignee: JIAGENG (JIANGSU) SPECIAL MATERIALS CO., LTD., Taizhou (CN)

( * ) Notice: Subject to any disclaimer, the term of this patent is extended or adjusted under 35 U.S.C. 154(b) by 248 days.

(21) Appl. No.: 18/438,669

(22) Filed: Feb. 12, 2024

(65) Prior Publication Data

US 2024/0182367 A1 Jun. 6, 2024

(30) Foreign Application Priority Data

Apr. 12, 2023 (CN) ........................ 202310384782.2

(51) Int. Cl.
*C04B 35/565* (2006.01)
*B28B 1/00* (2006.01)
(Continued)

(52) U.S. Cl.
CPC ............ *C04B 35/565* (2013.01); *B28B 1/001* (2013.01); *B33Y 10/00* (2014.12); *B33Y 40/20* (2020.01); *C04B 35/573* (2013.01); *C04B 35/6263* (2013.01); *C04B 35/62655* (2013.01); *C04B 35/6269* (2013.01); *C04B 35/62695* (2013.01); *C04B 35/63424* (2013.01); *C04B 35/63448* (2013.01); *C04B 35/64* (2013.01);
(Continued)

(58) Field of Classification Search
CPC .............. B28B 1/001; C04B 35/62655; C04B 35/62695
See application file for complete search history.

(56) References Cited

U.S. PATENT DOCUMENTS

2012/0237745 A1* 9/2012 Dierkes .............. C04B 35/4885 427/532
2023/0191653 A1* 6/2023 Bartels ...................... B22C 9/10 164/228

FOREIGN PATENT DOCUMENTS

CN 106082993 B * 4/2019 ....... C04B 35/62695
CN 110815822 A * 2/2020 ............... B22C 9/02
CN 115286394 A * 11/2022 ........... C04B 35/622

OTHER PUBLICATIONS

CN-115286394-A (Chen) Nov, 4, 2022 (English language translation). [online] [retrieved Dec. 4, 2025]. Retrieved from: Espacenet. (Year: 2022).*

(Continued)

*Primary Examiner* — Erin Snelting
(74) *Attorney, Agent, or Firm* — ScienBiziP, P.C.

(57) ABSTRACT

A method for manufacturing a SiC ceramic part is provided. The method includes mixing SiC micron powders, nano carbon black and an additive in a solvent to obtain a spray slurry. The spray slurry is subjected to spray granulation to obtain SiC granulation powders. The SiC granulation powders and SiC unprocessed powders are mixed and printed by 3DP to obtain a green body. Then the green body is impregnated in a phenolic resin precursor and undergoes a cracking reaction to obtain a compact body. Finally, the compact body is subjected to reactive sintering to obtain the SiC ceramic part. The method is beneficial to improving the density and the strength of the SiC ceramic part.

19 Claims, 8 Drawing Sheets

(51) Int. Cl.

| | |
|---|---|
| ***B33Y 10/00*** | (2015.01) |
| ***B33Y 40/20*** | (2020.01) |
| ***C04B 35/573*** | (2006.01) |
| ***C04B 35/626*** | (2006.01) |
| ***C04B 35/634*** | (2006.01) |
| ***C04B 35/64*** | (2006.01) |
| ***C04B 41/00*** | (2006.01) |
| ***C04B 41/45*** | (2006.01) |
| ***C04B 41/50*** | (2006.01) |
| ***C04B 41/83*** | (2006.01) |

(52) U.S. Cl.

CPC ...... *C04B 41/0072* (2013.01); *C04B 41/4539* (2013.01); *C04B 41/4578* (2013.01); *C04B 41/5001* (2013.01); *C04B 41/83* (2013.01); *C04B 2235/3826* (2013.01); *C04B 2235/424* (2013.01); *C04B 2235/48* (2013.01); *C04B 2235/528* (2013.01); *C04B 2235/5436* (2013.01); *C04B 2235/5454* (2013.01); *C04B 2235/5472* (2013.01); *C04B 2235/549* (2013.01); *C04B 2235/6026* (2013.01); *C04B 2235/616* (2013.01); *C04B 2235/6567* (2013.01)

(56) References Cited

OTHER PUBLICATIONS

Wang et al. Direct ink writing of reaction bonded silicon carbide ceramics with high thermal conductivity. Ceramics International 49 (Nov. 21, 2022) 10014-10022. (Year: 2022).*

CN-106082993-B (Xu) Apr. 2, 2019 (English language translation). [online] [retrieved Dec. 5, 2025]. Retrieved from: Espacenet. (Year: 2019).*

CN-110815822-A (Shi) Feb. 21, 2020 (English language translation). [online] [retrieved Dec. 8, 2025]. Retrieved from: Espacenet. (Year: 2020).*

Wikipedia contributors. (Jan. 10, 2023). Carbon black. In Wikipedia, The Free Encyclopedia. Retrieved from the internet: <https://en.wikipedia.org/w/index.php?title=Carbon_black&oldid=1132668658>. (Year: 2023).*

* cited by examiner

METHOD FOR MANUFACTURING A SIC CERAMIC PART

FIELD

The present disclosure relates to a field of ceramic materials produce, and in particular to a method for manufacturing a SiC ceramic part.

BACKGROUND

At present, the material of core components used for load-bearing in general semiconductors is mainly quartz. However, the temperature resistance of quartz is 1200° C., and its mechanical properties are poor. SiC ceramics have many excellent properties such as high high-temperature strength, good oxidation resistance, good thermal stability, low thermal expansion coefficient, high hardness and good thermal shock resistance, so that SiC ceramics is more suitable than quartz to be used as a material of core components for general semiconductors. Therefore, how to further improve the performances of the SiC ceramic material is an urgent problem to be solved.

SUMMARY

In view of the above situation, it is necessary to provide method for manufacturing a SiC ceramic part.

According to some embodiments, the method includes mixing SiC micron powders, nano carbon black and an additive in a solvent to obtain a spray slurry. The spray slurry is subjected to spray granulation to obtain SiC granulation powders. The SiC granulation powders and SiC unprocessed powders are mixed and printed by 3DP to obtain a green body. The green body is impregnated in a phenolic resin precursor and undergoes a cracking reaction to obtain a compact body. The compact body is subjected to reactive sintering to obtain the SiC ceramic part.

In the present disclosure, the spray granulation is combined with 3DP without relying on molds, so that the method is suitable for mass production. The impregnation-cracking process in the method effectively improves the carbonization problem of the green body during reactive sintering after 3DP, so that the density of the product can be effectively improved. The method is also suitable for the production of large and complex SiC ceramic parts for general semiconductors, which can greatly reduce the preparation cost, at the same time, ensure the improvement of the accuracy, the density and the strength of the products, and extend the service life of the products.

BRIEF DESCRIPTION OF THE DRAWINGS

Implementations of the present disclosure will now be described, by way of example only, with reference to the attached figures.

DETAILED DESCRIPTION

Figure 1:
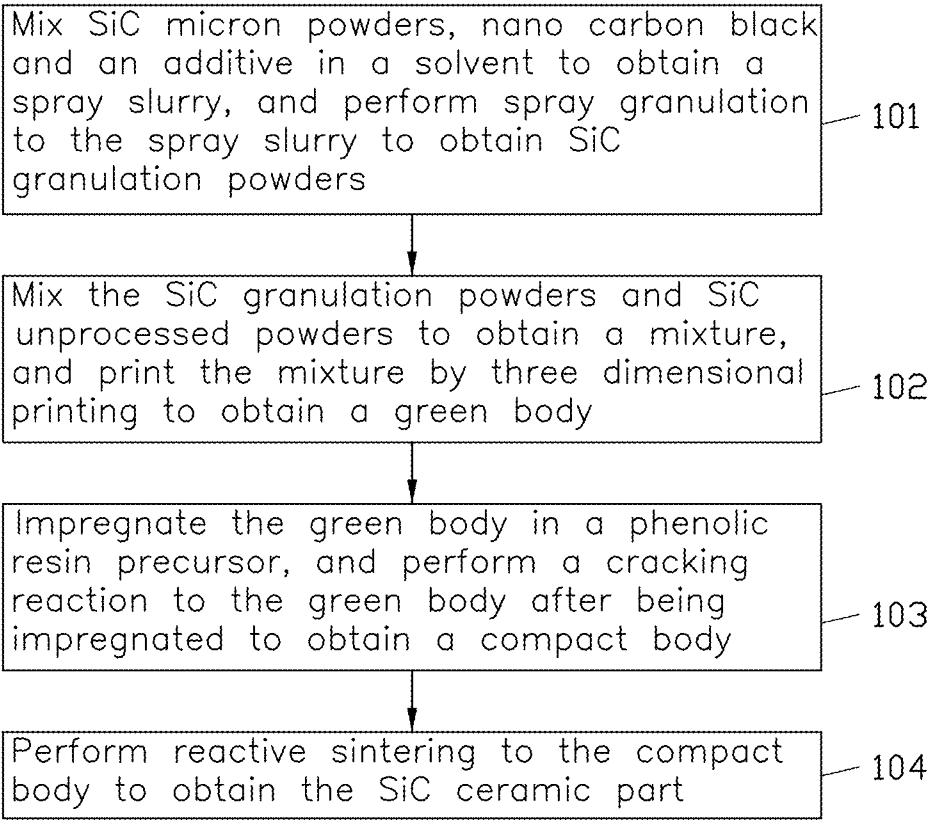
FIG. 1 is a flowchart of a method for manufacturing a SiC ceramic part according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates a flowchart of a method in accordance with an embodiment. The method for manufacturing a SiC ceramic part is provided by way of embodiments, as there are a variety of ways to carry out the method. Each block shown in FIG. 1 represents one or more processes, methods, or subroutines carried out in the method. Furthermore, the illustrated order of blocks can be changed. Additional blocks may be added or fewer blocks may be utilized, without departing from this disclosure. The method can begin at block 101.

At block 101, SiC micron powders, nano carbon black and an additive are mixed in a solvent to obtain a spray slurry, and the spray slurry is subjected to spray granulation to obtain SiC granulation powders.

At block 102, the SiC granulation powders and SiC unprocessed powders are mixed and printed by 3DP (Three Dimensional Printing) to obtain a green body. In at least one embodiment, the SiC unprocessed powders may be SiC micron powders.

At block 103, the green body is impregnated in a phenolic resin precursor and undergoes a cracking reaction to obtain a compact body.

At block 104, the compact body is subjected to reactive sintering to obtain the SiC ceramic part.

In the present disclosure, the spray granulation is combined with 3DP without relying on molds, so that the method is suitable for mass production. The impregnation-cracking process in the method effectively improves the carbonization problem of the green body during reactive sintering after 3DP, so that the density of the product can be effectively improved. The method is also suitable for the production of large and complex SiC ceramic parts for general semiconductors, which can greatly reduce the preparation cost, at the same time, ensure the improvement of the accuracy, the density and the strength of the products, and extend the service life of the products.

In at least one embodiment, a grain size of each of the SiC micron powders may be in a range of 1 μm to 5 μm, such as but not limited to 1 μm, 1.5 μm, 2 μm, 2.5 μm, 3 μm, 3.5 μm, 4 μm, 4.5 μm, 5 μm, or any value between any two adjacent values mentioned above. In the present disclosure, a grain size of a powder refers to a size of the powder at its widest point.

In at least one embodiment, a grain size of the nano carbon black may be in a range of 10 nm to 30 nm, such as but not limited to 10 nm, 12 nm, 14 nm, 16 nm, 18 nm, 20 nm, 22 nm, 24 nm, 26 nm, 28 nm, 30 nm, or any value between any two adjacent values mentioned above.

In at least one embodiment, if the spray slurry includes 100 parts by weight of the SiC micron powders, the spray slurry may further include 5 to 15 parts by weight of the nano carbon black, such as 5 parts by weight of the nano carbon black, 6 parts by weight of the nano carbon black, 7 parts by weight of the nano carbon black, 8 parts by weight of the nano carbon black, 9 parts by weight of the nano carbon black, 10 parts by weight of the nano carbon black, 11 parts by weight of the nano carbon black, 12 parts by weight of the nano carbon black, 13 parts by weight of the nano carbon black, 14 parts by weight of the nano carbon black, 15 parts by weight of the nano carbon black, or any value between any two adjacent values mentioned above. That is, in the spray slurry, a mass ratio of the SiC micron powders to the nano carbon black may be 20:1 to 20:3.

In at least one embodiment, the additive may include an adhesive agent, a dispersing agent, and a defoaming agent. The adhesive agent plays a bonding role during spray granulation. The defoaming agent plays a role of inhibiting and destroying walls of bubbles, thereby achieving the defoaming effect of the spray slurry used for spray granulation. If there are too many bubbles in the spray slurry, the spray slurry will be difficult to feed and the quality of the SiC granulation powders will be poor.

In at least one embodiment, if the spray slurry includes 100 parts by weight of the SiC micron powders, the spray slurry may further include 0.5 to 2 parts by weight of the adhesive agent, such as 0.5 parts by weight of the adhesive agent, 0.6 parts by weight of the adhesive agent, 0.7 parts by weight of the adhesive agent, 0.8 parts by weight of the adhesive agent, 0.9 parts by weight of the adhesive agent, 1 parts by weight of the adhesive agent, 1.1 parts by weight of the adhesive agent, 1.2 parts by weight of the adhesive agent, 1.3 parts by weight of the adhesive agent, 1.4 parts by weight of the adhesive agent, 1.5 parts by weight of the adhesive agent, 1.6 parts by weight of the adhesive agent, 1.7 parts by weight of the adhesive agent, 1.8 parts by weight of the adhesive agent, 1.9 parts by weight of the adhesive agent, 2 parts by weight of the adhesive agent, or any value between any two adjacent values mentioned above. That is, in the spray slurry, a mass ratio of the SiC micron powders to the adhesive agent may be 200:1 to 50:1. In the spray slurry, if a content of the adhesive agent is too high, each of the SiC granulation powders will have irregular shape and poor density, and if a content of the adhesive agent is too low, the grain size of each of the SiC granulation powders will small, and the SiC granulation powders will be difficult to agglomerate and form.

In at least one embodiment, the adhesive agent may include at least one of propylene with carboxyl, propylene with amino group, dicyanodiamide, and amine organic dispersions, such as but not limited to, a combination of propylene with carboxyl and propylene with amino group, a combination of propylene with carboxyl and dicyanodiamide, a combination of propylene with carboxyl and amine organic dispersions, a combination of propylene with amino group and dicyanodiamide, a combination of propylene with amino group and amine organic dispersions, or a combination of dicyanodiamide and amine organic dispersions.

In at least one embodiment, if the spray slurry includes 100 parts by weight of the SiC micron powders, the spray slurry may further include 0.5 to 1.5 parts by weight of the dispersing agent, such as 0.5 parts by weight of the dispersing agent, 0.6 parts by weight of the dispersing agent, 0.7 parts by weight of the dispersing agent, 0.8 parts by weight of the dispersing agent, 0.9 parts by weight of the dispersing agent, 1 parts by weight of the dispersing agent, 1.1 parts by weight of the dispersing agent, 1.2 parts by weight of the dispersing agent, 1.3 parts by weight of the dispersing agent, 1.4 parts by weight of the dispersing agent, 1.5 parts by weight of the dispersing agent, or any value between any two adjacent values mentioned above. That is, in the spray slurry, a mass ratio of the SiC micron powders to the dispersing agent may be 200:1 to 200:3. In the spray slurry, if a content of the dispersing agent is too high, organic polymer chains in the spray slurry will become entangled with each other and restrict movement between powders, and if a content of the dispersing agent is too low, the spray slurry will have a high viscosity and be flocculated, so that it is impossible to feed for the spray granulation.

In at least one embodiment, the dispersing agent may include at least one of polyacrylate, citrate, polyethylene glycol, and tetramethylammonium hydroxide, such as but not limited to, a combination of polyacrylate and citrate, a combination of polyacrylate and polyethylene glycol, a combination of polyacrylate and tetramethylammonium hydroxide, a combination of citrate and polyethylene glycol, a combination of citrate and tetramethylammonium hydroxide, or a combination of polyethylene glycol and tetramethylammonium hydroxide.

In at least one embodiment, if the spray slurry includes 100 parts by weight of the SiC micron powders, the spray slurry may further include 0.4 to 1.2 parts by weight of the defoaming agent, such as 0.4 parts by weight of the defoaming agent, 0.5 parts by weight of the defoaming agent, 0.6 parts by weight of the defoaming agent, 0.7 parts by weight of the defoaming agent, 0.8 parts by weight of the defoaming agent, 0.9 parts by weight of the defoaming agent, 1 parts by weight of the defoaming agent, 1.1 parts by weight of the defoaming agent, 1.2 parts by weight of the defoaming agent, or any value between any two adjacent values mentioned above. That is, in the spray slurry, a mass ratio of the SiC micron powders to the defoaming agent may be 250:1 to 250:3.

In at least one embodiment, the defoaming agent may include at least one of sodium carboxymethyl cellulose, 1-octanol, 1-butanol, and tributyl phosphate, such as but not limited to, a combination of sodium carboxymethyl cellulose and 1-octanol, a combination of sodium carboxymethyl cellulose and 1-butanol, a combination of sodium carboxymethyl cellulose and tributyl phosphate, a combination of 1-octanol and 1-butanol, a combination of 1-octanol and tributyl phosphate, or a combination of 1-butanol and tributyl phosphate.

In at least one embodiment, the solvent may include water.

It should be noted that in the present disclosure, a method of mixing the SiC micron powders, the nano carbon black and the additive in the solvent is not limited, as long as a purpose of uniform mixing is achieved, for example, the SiC micron powders, the nano carbon black and the additive in the solvent may be mixed by ball-milling.

In at least one embodiment, a solid content of the spray slurry may be 30 wt % to 50 wt %, such as but not limited to 30 wt %, 32 wt %, 34 wt %, 36 wt %, 38 wt %, 40 wt %, 42 wt %, 44 wt %, 46 wt %, 48 wt %, 50 wt %, or any value between any two adjacent values mentioned above.

In at least one embodiment, a temperature of an inlet of the spray granulation may be in a range of 200 degrees Celsius to 300 degrees Celsius, such as but not limited to 200 degrees Celsius, 210 degrees Celsius, 220 degrees Celsius, 230 degrees Celsius, 240 degrees Celsius, 250 degrees Celsius, 260 degrees Celsius, 270 degrees Celsius, 280 degrees Celsius, 290 degrees Celsius, 300 degrees Celsius, or any value between any two adjacent values mentioned above.

In at least one embodiment, a temperature of an outlet of the spray granulation may be in a range of 120 degrees Celsius to 190 degrees Celsius, such as but not limited to 120 degrees Celsius, 130 degrees Celsius, 140 degrees Celsius, 150 degrees Celsius, 160 degrees Celsius, 170 degrees Celsius, 180 degrees Celsius, 190 degrees Celsius, or any value between any two adjacent values mentioned above.

The temperature of the inlet and the temperature of the outlet of the spray granulation affects the grain size and the strength of the granulation powders. If the temperature of the inlet of the spray granulation is too high, the air at the top of a spray tower will be overheated, at this time, when mist droplets rise to a high place and encounter hot air, the curing effect will be reduced. If the temperature of the outlet of the spray granulation is too high, the mist droplets will be dried quickly, so that the granulation powders will be too fine and a nozzle of the spray granulation will be easily blocked. If the temperature of the inlet of the spray granulation is too low, a solvent in the mist droplets will be evaporated slowly, and the mist droplets will easily stick to walls of the spray granulator, so that the strength of the granulation powders is not enough, and there are many broken particles, and the fluidity is poor. If the temperature of the outlet of the spray granulation is too low, it will have a negative impact on the morphology of the granulation powders. In a word, the higher the temperature, the finer the granulation powders are produced, and the lower the temperature, the coarser the granulation powders are produced.

In at least one embodiment, each of the SiC granulation powders may be a spherical particle with a particle size of 5 μm to 150 μm. In at least one embodiment, each of the SiC granulation powders may be the spherical particle with the particle size of 50 μm to 150 μm, such as but not limited to 50 μm, 55 μm, 60 μm, 65 μm, 70 μm, 75 μm, 80 μm, 85 μm, 90 μm, 95 μm, 100 μm, 105 μm, 110 μm, 115 μm, 120 μm, 125 μm, 130 μm, 135 μm, 140 μm, 145 μm, 150 μm, or any value between any two adjacent values mentioned above.

The SiC granulation powders and the SiC unprocessed powders may be subjected to grain size gradation. If the particle size of each of the SiC granulation powders is too small, without the support of powders with large particle size, a layer thickness of the 3DP will be reduced and the printing efficiency will be reduced. If the particle size of each of the SiC granulation powders is too large, a porosity of the green body and pore size of pores in the green body printed by the 3DP will be increased, thereby affecting the siliconization effect of subsequent reactive sintering and reducing the performance of ceramic products. Proper gradation can shorten the distance between powders and reduce the energy required for the mass-transfer by diffusion, thereby increasing the sintering density.

In at least one embodiment, a grain size of each of the SiC unprocessed powders may be in a range of 10 μm to 50 μm, such as but not limited to 10 μm, 15 μm, 20 μm, 25 μm, 30 μm, 35 μm, 40 μm, 45 μm, 50 μm, or any value between any two adjacent values mentioned above.

In at least one embodiment, a mass ratio of the SiC granulation powders to the SiC unprocessed powders may be 1:1 to 7:1, such as but not limited to 1:1, 1.5:1, 2:1, 2.5:1, 3:1, 3.5:1, 4:1, 4.5:1, 5:1, 5.5:1, 6:1, 6.5:1, 7:1, or any value between any two adjacent values mentioned above.

The mass ratio of the SiC granulation powders to the SiC unprocessed powders will affect the strength and the porosity of the green body printed by the 3DP and the strength of the SiC ceramic part. As the content of the SiC granulation powders increases, the content of the nano carbon black in the green body increases, so that the density and the strength of the SiC ceramic part after sintering increase. However, if the content of the nano carbon black is too high, CO generated by the reactive sintering cannot be discharged in time, so that the compact body may easily crack during sintering, and black areas will easily appear inside the SiC ceramic part. If the content of the nano carbon black is too low, the granularity of the SiC ceramic part and the content of the free Si will increase, and the strength and the toughness of the SiC ceramic part will decrease as the granularity of the SiC ceramic part increases.

In at least one embodiment, the SiC granulation powders and SiC unprocessed powders may be mixed by dry mixing.

In at least one embodiment, the 3DP uses independent dual nozzles to spray an ink and a curing agent respectively.

The dual nozzles work independently and are independently controlled. The dual nozzles are also cooperated with each other.

The ink may include Furan resin molecule. Furan resin molecule has a linear structure, most of active groups such as active hydroxymethyl groups in the furan resin molecule are wrapped inside the furan resin molecule and isolated from active groups of other molecules. After adding the curing agent, under the action of acid, the furan resin molecules first stretch and undergo initial curing, thereby slowly increasing the strength of the green body, and then rapidly undergo cross-linking reactions, so that the strength of the green body is increased rapidly during later curing.

During the reaction, it will have no obvious effect on resin hardening when the amount of curing agent is too small, and if the amount of curing agent is too much, too many pores and defects will be formed in the green body, so that the performance of the SiC ceramic part will be affected.

The 3DP may be realized through Binder Jetting (BJ) The principle of the BJ is to prepare ceramic powder and adhesive into a ceramic slurry with a high solid content and a certain viscosity, the ceramic slurry is extruded by a nozzle with a special diameter through a mechanical device or a gas pressure device and deposited on a molding platform, and then the ceramic slurry is extruded and deposited layer by layer through the lifting and lowering of the molding platform or the nozzle to form a three-dimensional ceramic green body, finally the three-dimensional ceramic green body is degreased, degummed, and sintered at a high temperature to obtain the final ceramic material and its products. The 3DP may be realized through Fused Deposition Modeling (FDM). The principle of the FDM is to mix and draw SiC ceramic powder and polymer materials into thermoplastic polymer ceramic wires (SiC wires) of a certain diameter, the prepared SiC wires are placed on a FDM equipment, extruded by a heated nozzle of the equipment to be deposited on a molding platform of the equipment and solidified and formed after the temperature is lowered, then the molding platform is lowered, and the SiC ceramic material green body formed after deposition is cyclically melted, degreased, degummed, and sintered at a high temperature to obtain the final ceramic material and its products. The difference between the above methods for preparing ceramic products is: first, the raw material of the FDM method is thermoplastic polymer wires, while the raw material of the BJ method is ceramic powders; second, the FDM method is s suitable for products with high molding accuracy and small size, while the BJ method is suitable for products with low molding accuracy requirements, large size, the BJ method is suitable for large-scale production, the cost of the BJ method is low, and the process of the BJ method is simple.

In at least one embodiment, the ink may include a furan resin solution with a solid content of 48 wt % to 52 wt %, such as but not limited to 48 wt %, 48.5 wt %, 49 wt %, 49.5 wt %, 50 wt %, 50.5 wt %, 51 wt %, 51.5 wt %, 52 wt %, or any value between any two adjacent values mentioned above.

The curing agent may include an aqueous solution of benzenesulfonic acid. In at least one embodiment, in the aqueous solution of benzenesulfonic acid, a mass ratio of benzenesulfonic acid to water may be 0.5 to 1.5, such as but not limited to 0.5, 0.6, 0.7, 0.8, 0.9, 1.0, 1.1, 1.2, 1.3, 1.4, 1.5, or any value between any two adjacent values mentioned above.

In at least one embodiment, during the 3DP, a ratio of a total mass of the SiC granulation powders and the SiC unprocessed powders to a mass of the ink may be in a range of 100:0.5 to 100:1.5, such as but not limited to 100:0.5, 100:0.6, 100:0.7, 100:0.8, 100:0.9, 100:1, 100:1.1, 100:1.2, 100:1.3, 100:1.4, 100:1.5, or any value between any two adjacent values mentioned above.

In at least one embodiment, during the 3DP, a ratio of the total mass of the SiC granulation powders and the SiC unprocessed powders to a mass of the curing agent may be in a range of 100:0.4 to 100:1.2, such as but not limited to 100:0.4, 100:0.5, 100:0.6, 100:0.7, 100:0.8, 100:0.9, 100:1, 100:1.1, 100:1.2, or any value between any two adjacent values mentioned above.

In at least one embodiment, a height of each printing layer of the 3DP may be in a range of 10 μm to 150 μm. In at least one embodiment, the height of each printing layer of the 3DP may be in a range of 20 μm to 150 μm, such as but not limited to 20 μm, 30 μm, 40 μm, 50 μm, 60 μm, 70 μm, 80 μm, 90 μm, 100 μm, 110 μm, 120 μm, 130 μm, 140 μm, 150 μm, or any value between any two adjacent values mentioned above.

The phenolic resin precursor includes a phenolic resin and a solvent. The phenolic resin may include p-tert-butyl phenolic resin. The solvent in the phenolic resin precursor may include methanol. Methanol has advantages of being cheap, low viscosity, and highly efficient in impregnation as the solvent.

In the phenolic resin precursor, a mass ratio of the phenolic resin to the methanol may be in a range of 1:1 to 3:1, such as but not limited to 1:1, 1.2:1, 1.4:1, 1.6:1, 1.8:1, 2:1, 2.2:1, 2.4:1, 2.6:1, 2.8:1, 3:1, or any value between any two adjacent values mentioned above.

In at least one embodiment, the green body may be impregnated in the phenolic resin precursor for 10 h to 20 h, such as but not limited to 10 h, 11 h, 12 h, 13 h, 14 h, 15 h, 16 h, 17 h, 18 h, 19 h, 20 h, or any value between any two adjacent values mentioned above.

In at least one embodiment, a temperature of the cracking reaction may be in a range of 600 degrees Celsius to 900 degrees Celsius, such as but not limited to 600 degrees Celsius, 620 degrees Celsius, 640 degrees Celsius, 660 degrees Celsius, 680 degrees Celsius, 700 degrees Celsius, 720 degrees Celsius, 740 degrees Celsius, 760 degrees Celsius, 780 degrees Celsius, 800 degrees Celsius, 820 degrees Celsius, 840 degrees Celsius, 860 degrees Celsius, 880 degrees Celsius, 900 degrees Celsius, or any value between any two adjacent values mentioned above. A duration of the cracking reaction may be in a range of 1 h to 3 h, such as but not limited to 1 h, 1.2 h, 1.4 h, 1.6 h, 1.8 h, 2 h, 2.2 h, 2.4 h, 2.6 h, 2.8 h, 3 h, or any value between any two adjacent values mentioned above.

In at least one embodiment, a temperature of the reactive sintering may be in a range of 1500 degrees Celsius to 1900 degrees Celsius. In at least one embodiment, the temperature of the reactive sintering may be in a range of 1500 degrees Celsius to 1700 degrees Celsius, such as but not limited to 1500 degrees Celsius, 1520 degrees Celsius, 1540 degrees Celsius, 1560 degrees Celsius, 1580 degrees Celsius, 1600 degrees Celsius, 1660 degrees Celsius, 1680 degrees Celsius, 1700 degrees Celsius, or any value between any two adjacent values mentioned above. A duration of the reactive sintering may be in a range of 0.5 h to 5 h. In at least one embodiment, the duration of the reactive sintering may be in a range of 0.5 h to 3 h, such as but not limited to 0.5 h, 0.7 h, 0.9 h, 1.1 h, 1.3 h, 1.5 h, 1.7 h, 1.9 h, 2.1 h, 2.3 h, 2.5 h, 2.7 h, 3 h, or any value between any two adjacent values mentioned above.

The present disclosure also provides a SiC ceramic part (not shown). The SiC ceramic part is manufactured by the above method.

The SiC ceramic part can be applied in a general semiconductor (not shown).

In the above method, a comprehensive scheme of spray granulation, 3DP and impregnation-cracking is used to prepare SiC ceramic parts. First, spray granulation is used to improve and optimize the raw material powder for 3DP, so that the grain size gradation is more reasonable, which facilitates subsequent inkjet and silicon infiltration. The 3DP uses independent dual nozzles to solve the problem of uneven mixing of ink and the curing agent and the problem of poor sintering performance of the green body. Furthermore, the repeated impregnation-cracking process can effectively improve the carburization problem of the green body during reactive sintering after 3DP, o that the density of the product can be effectively improved. The above method can effectively improve the reliability, structural uniformity and mechanical properties of the SiC ceramic parts, so that the service life of SiC ceramic parts as core components of the general semiconductor can be effectively improved.

Embodiment 1

A method for manufacturing a SiC ceramic part was provided and included following steps:

1000 g D50=1 μm of SiC micron powders and 50 g D50=10 nm of nano carbon black, 5 g of dicyanodiamide, 5 g of sodium polyacrylate, 4 g of 1-octanol, and 2000 mL of water were mixed by ball-mixing for 1 h to form a spray slurry with a solid content of 50 wt %. A temperature of an inlet of a spray granulation was set to 200 degrees Celsius, a temperature of an outlet of the spray granulation was set to 120 degrees Celsius, a frequency of the spray granulation was set to 50 Hz, the spray slurry was subjected to the spray granulation to obtain solid spherical SiC granulation powders with a diameter of 150 μm.

The above SiC granulation powders and D50=10 μm of SiC unprocessed powders were mixed at a mass ratio of 1:1 for 10 h by dry mixing to obtain raw material powders for 3DP. The 3DP uses independent dual nozzles, one of the nozzles ejects an ink, at the same time, the other of the nozzles ejects a curing agent. The ink was a furan resin solution with a solid content of 50 wt %, and the curing agent was a solution formed by benzenesulfonic acid and water at a mass ratio of 1:1. The raw material powders, the ink, and the curing agent were used for the 3DP at a mass ratio of 100:0.5:0.4, and a height of each printing layer of the 3DP was 150 μm, thereby obtaining a green body.

The green body was impregnated in a solution formed by p-tert-butyl phenolic resin and methanol at a mass ratio of 1:1 for 10 h, and then underwent a cracking reaction at a temperature of 600 degrees Celsius for 1 h, thereby obtaining a compact body.

The compact body was subjected to reactive sintering at a temperature of 1700 degrees Celsius for 0.5 h to obtain a SiC ceramic part.

Figure 2:
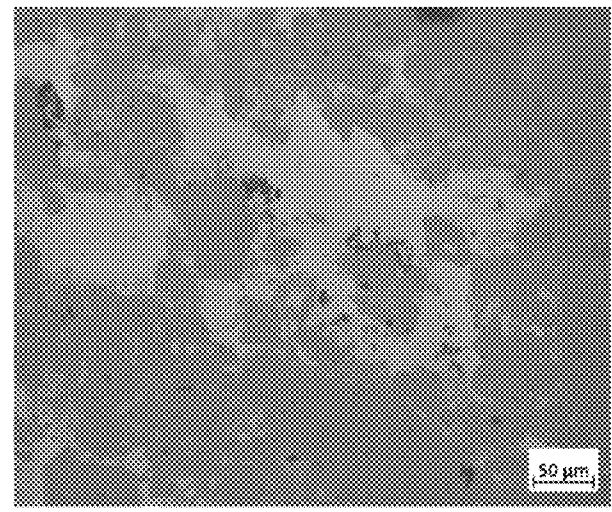
FIG. 2 is a metallographic microscope image of the SiC ceramic part of EMBODIMENT 1.

FIG. 2 is a metallographic microscope image of the SiC ceramic part of EMBODIMENT 1.

Figure 6:
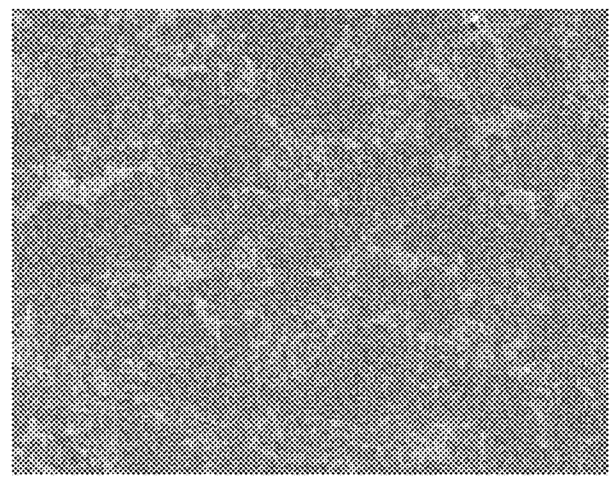
FIG. 6 is a SEM image of the SiC ceramic part of EMBODIMENT 1.

FIG. 6 is a SEM image of the SiC ceramic part of EMBODIMENT 1.

Figure 10:
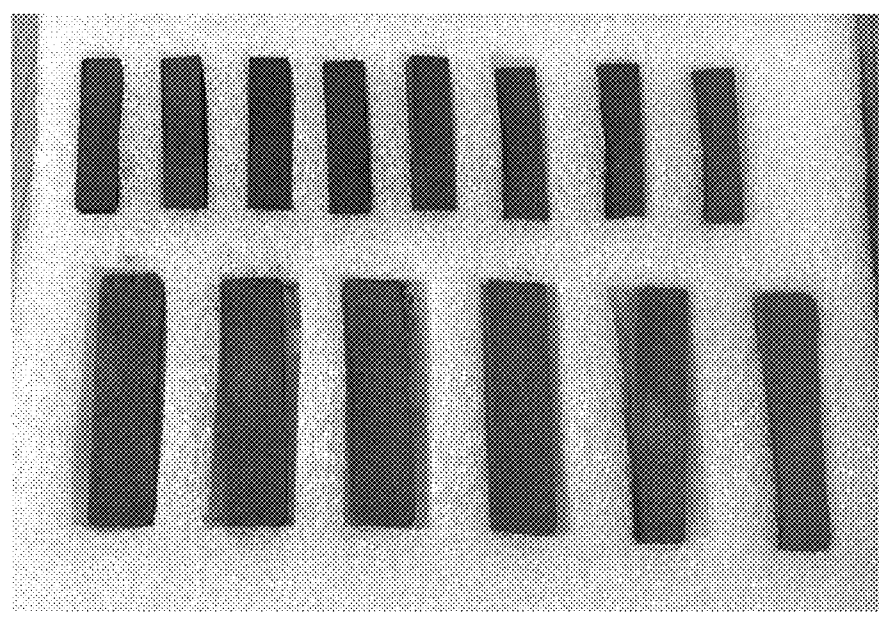
FIG. 10 is a picture of the green body of EMBODIMENT 1.

FIG. 10 is a picture of the green body of EMBODIMENT 1.

Figure 11:
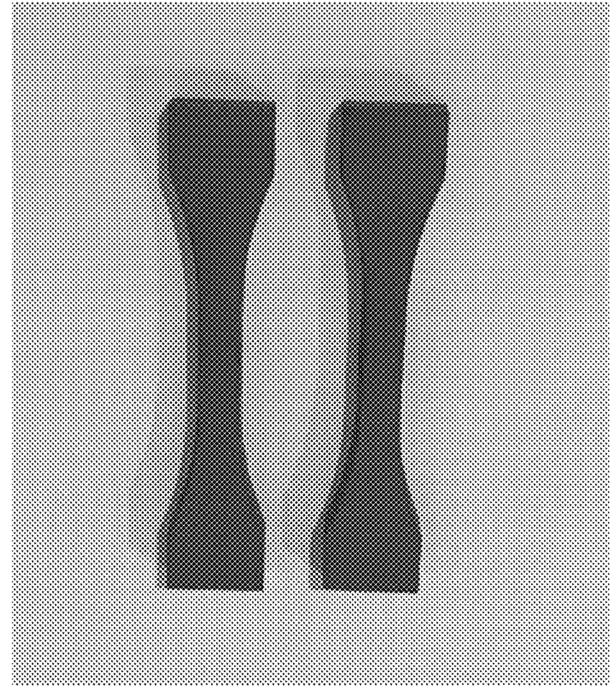
FIG. 11 is a picture of splines obtained after the green body of FIG. 10 was subjected to reactive sintering.

FIG. 11 is a picture of splines obtained after the green body of FIG. 10 was subjected to reactive sintering. The splines are used in carriers in a general semiconductor.

Figure 12:
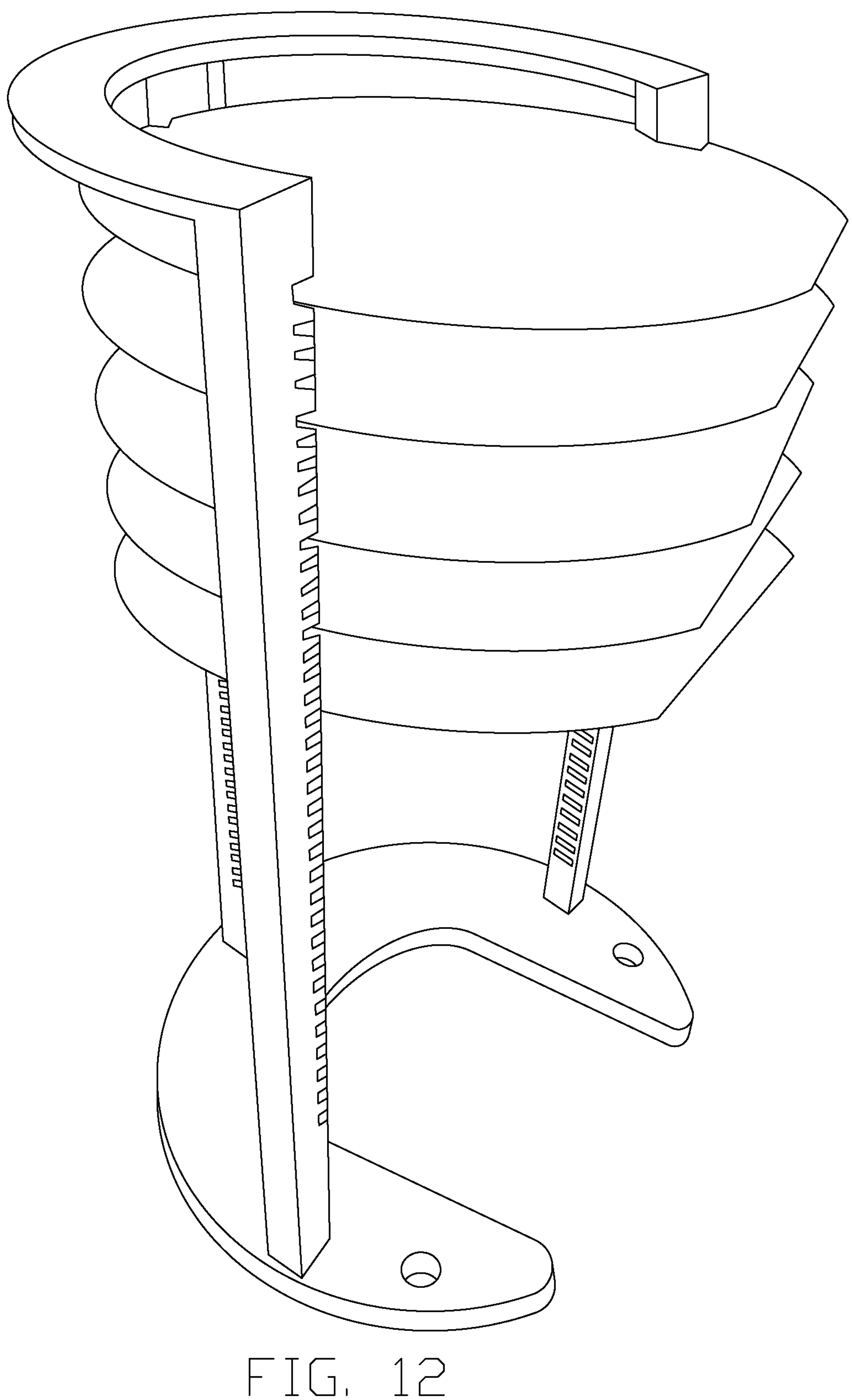
FIG. 12 is a picture of a wafer carrying boat obtained by using the preparation method of EMBODIMENT 1.

FIG. 12 is a picture of a wafer carrying boat obtained by using the preparation method of EMBODIMENT 1. The wafer carrying boat is assembled from different parts manufactured using the preparation method of EMBODIMENT 1.

Embodiment 2

A method for manufacturing a SiC ceramic part was provided and included following steps:

1000 g D50=3 μm of SiC micron powders and 100 g D50=20 nm of nano carbon black, 10 g of propylene with amino group, 10 g of sodium citrate, 8 g of sodium carboxymethyl cellulose, and 2500 mL of water were mixed by ball-mixing for 3 h to form a spray slurry with a solid content of 40 wt %. A temperature of an inlet of a spray granulation was set to 250 degrees Celsius, a temperature of an outlet of the spray granulation was set to 170 degrees Celsius, a frequency of the spray granulation was set to 50 Hz, the spray slurry was subjected to the spray granulation to obtain solid spherical SiC granulation powders with a diameter of 100 μm.

The above SiC granulation powders and D50=30 μm of SiC unprocessed powders were mixed at a mass ratio of 3:1 for 10 h by dry mixing to obtain raw material powders for 3DP. The 3DP uses independent dual nozzles, one of the nozzles ejects an ink, at the same time, the other of the nozzles ejects a curing agent. The ink was a furan resin solution with a solid content of 50 wt %, and the curing agent was a solution formed by benzenesulfonic acid and water at a mass ratio of 1:1. The raw material powders, the ink, and the curing agent were used for the 3DP at a mass ratio of 100:0.8:0.46, and a height of each printing layer of the 3DP was 100 μm, thereby obtaining a green body.

The green body was impregnated in a solution formed by p-tert-butyl phenolic resin and methanol at a mass ratio of 2:1 for 15 h, and then underwent a cracking reaction at a temperature of 700 degrees Celsius for 1.5 h, the above impregnation-cracking process was repeated a total of 2 times, thereby obtaining a compact body.

The compact body was subjected to reactive sintering at a temperature of 1600 degrees Celsius for 1 h to obtain a SiC ceramic part.

Figure 3:
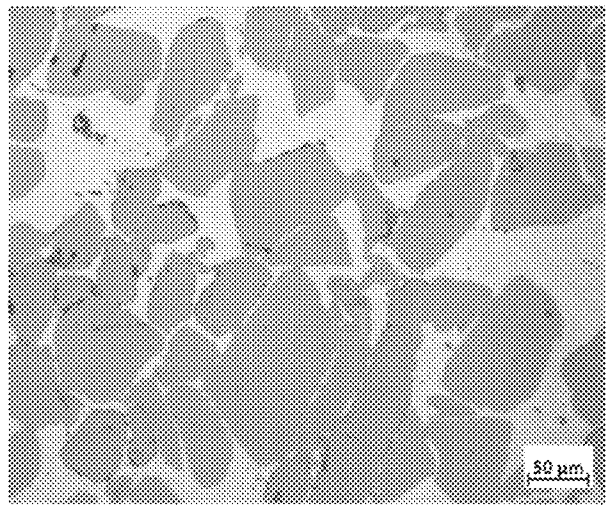
FIG. 3 is a metallographic microscope image of the SiC ceramic part of EMBODIMENT 2.

FIG. 3 is a metallographic microscope image of the SiC ceramic part of EMBODIMENT 2.

Figure 7:
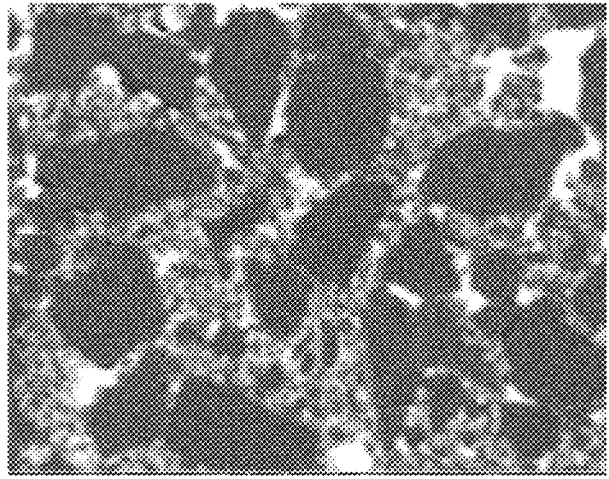
FIG. 7 is a SEM image of the SiC ceramic part of EMBODIMENT 2.

FIG. 7 is a SEM image of the SiC ceramic part of EMBODIMENT 2.

Embodiment 3

A method for manufacturing a SiC ceramic part was provided and included following steps:

1000 g D50=5 μm of SiC micron powders and 150 g D50=30 nm of nano carbon black, 15 g of dicyanodiamide, 15 g of polyethylene glycol, 12 g of 1-butanol, and 3300 mL of water were mixed by ball-mixing for 5 h to form a spray slurry with a solid content of 30 wt %. A temperature of an inlet of a spray granulation was set to 350 degrees Celsius, a temperature of an outlet of the spray granulation was set to 190 degrees Celsius, a frequency of the spray granulation was set to 50 Hz, the spray slurry was subjected to the spray granulation to obtain solid spherical SiC granulation powders with a diameter of 50 μm.

The above SiC granulation powders and D50=50 μm of SiC unprocessed powders were mixed at a mass ratio of 5:1 for 10 h by dry mixing to obtain raw material powders for 3DP. The 3DP uses independent dual nozzles, one of the nozzles ejects an ink, at the same time, the other of the nozzles ejects a curing agent. The ink was a furan resin solution with a solid content of 50 wt %, and the curing agent was a solution formed by benzenesulfonic acid and water at a mass ratio of 1:1. The raw material powders, the ink, and the curing agent were used for the 3DP at a mass ratio of 100:1.2:1, and a height of each printing layer of the 3DP was 20 μm, thereby obtaining a green body.

The green body was impregnated in a solution formed by p-tert-butyl phenolic resin and methanol at a mass ratio of 3:1 for 20 h, and then underwent a cracking reaction at a temperature of 800 degrees Celsius for 3 h, the above impregnation-cracking process was repeated a total of 3 times, thereby obtaining a compact body.

The compact body was subjected to reactive sintering at a temperature of 1500 degrees Celsius for 3 h to obtain a SiC ceramic part.

Figure 4:
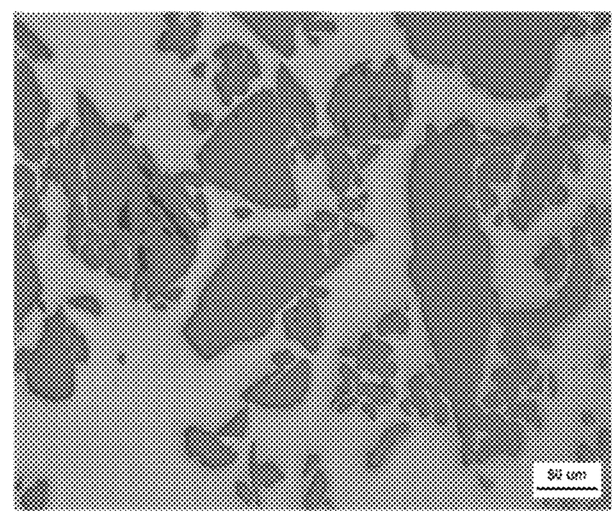
FIG. 4 is a metallographic microscope image of the SiC ceramic part of EMBODIMENT 3.

FIG. 4 is a metallographic microscope image of the SiC ceramic part of EMBODIMENT 3.

Figure 8:
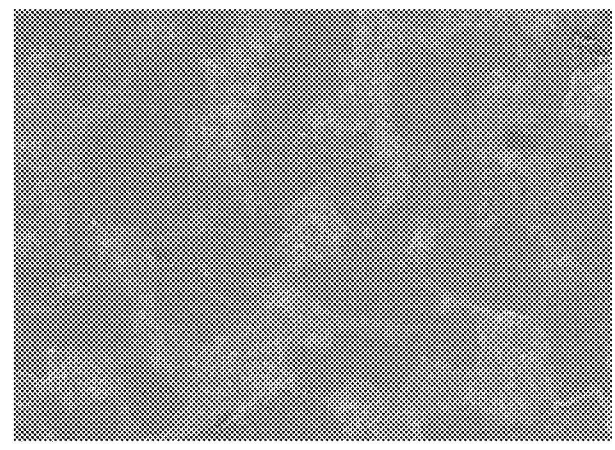
FIG. 8 is a SEM image of the SiC ceramic part of EMBODIMENT 3.

FIG. 8 is a SEM image of the SiC ceramic part of EMBODIMENT 3.

Embodiment 4

A method for manufacturing a SiC ceramic part was provided and included following steps:

1000 g D50=1 μm of SiC micron powders and 150 g D50=10 nm of nano carbon black, 20 g of amine organic dispersions, 5 g of tetramethylammonium hydroxide, 12 g of tributyl phosphate, and 2000 mL of water were mixed by ball-mixing for 10 h to form a spray slurry with a solid content of 50 wt %. A temperature of an inlet of a spray granulation was set to 250 degrees Celsius, a temperature of an outlet of the spray granulation was set to 150 degrees Celsius, a frequency of the spray granulation was set to 50 Hz, the spray slurry was subjected to the spray granulation to obtain solid spherical SiC granulation powders with a diameter of 120 μm.

The above SiC granulation powders and D50=50 μm of SiC unprocessed powders were mixed at a mass ratio of 7:1 for 10 h by dry mixing to obtain raw material powders for 3DP. The 3DP uses independent dual nozzles, one of the nozzles ejects an ink, at the same time, the other of the nozzles ejects a curing agent. The ink was a furan resin solution with a solid content of 50 wt %, and the curing agent was a solution formed by benzenesulfonic acid and water at a mass ratio of 1:1. The raw material powders, the ink, and the curing agent were used for the 3DP at a mass ratio of 100:1.5:1.2, and a height of each printing layer of the 3DP was 120 μm, thereby obtaining a green body.

The green body was impregnated in a solution formed by p-tert-butyl phenolic resin and methanol at a mass ratio of 1:1 for 20 h, and then underwent a cracking reaction at a temperature of 900 degrees Celsius for 1 h, the above impregnation-cracking process was repeated a total of 3 times, thereby obtaining a compact body.

The compact body was subjected to reactive sintering at a temperature of 1700 degrees Celsius for 1 h to obtain a SiC ceramic part.

Figure 5:
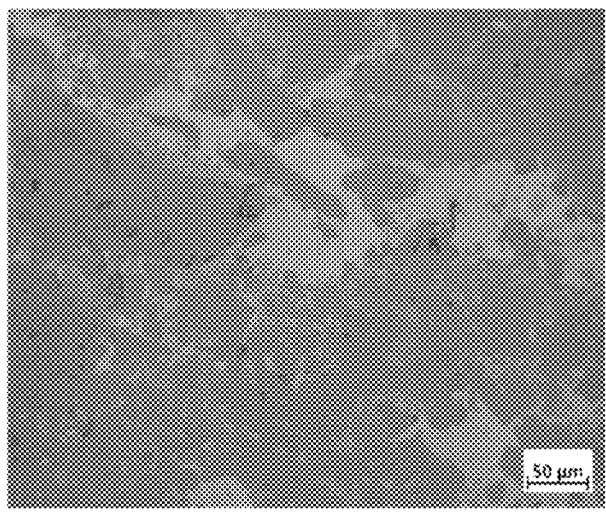
FIG. 5 is a metallographic microscope image of the SiC ceramic part of EMBODIMENT 4.

FIG. 5 is a metallographic microscope image of the SiC ceramic part of EMBODIMENT 4.

Figure 9:
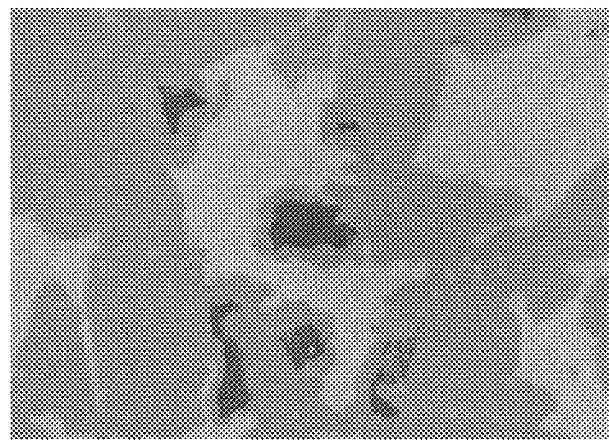
FIG. 9 is a SEM image of the SiC ceramic part of EMBODIMENT 4.

FIG. 9 is a SEM image of the SiC ceramic part of EMBODIMENT 4.

Embodiment 5

Different from the above EMBODIMENT 1, D50 of SiC micron powders was adjusted to 0.5 μm.

Embodiment 6

Different from the above EMBODIMENT 1, D50 of SiC micron powders was adjusted to 5 μm.

Embodiment 7

Different from the above EMBODIMENT 1, D50 of SiC micron powders was adjusted to 5.5 μm.

Embodiment 8

Different from the above EMBODIMENT 1, a mass ratio of the SiC granulation powders to the SiC unprocessed powders was adjusted to 1:2.

Embodiment 9

Different from the above EMBODIMENT 1, a mass ratio of the SiC granulation powders to the SiC unprocessed powders was adjusted to 7:1.

Embodiment 10

Different from the above EMBODIMENT 1, a mass ratio of the SiC granulation powders to the SiC unprocessed powders was adjusted to 8:1.

Embodiment 11

Different from the above EMBODIMENT 1, the impregnation-cracking process are repeated a total of 3 times.

Embodiment 12

Different from the above EMBODIMENT 1, the impregnation-cracking process are repeated a total of 4 times.

Embodiment 13

Different from the above EMBODIMENT 1, the impregnation-cracking process are repeated a total of 5 times.

Embodiment 14

Different from the above EMBODIMENT 1, a temperature of the cracking reaction was adjusted to 550 degrees Celsius.

Embodiment 15

Different from the above EMBODIMENT 1, a temperature of the cracking reaction was adjusted to 900 degrees Celsius.

Embodiment 16

Different from the above EMBODIMENT 1, a temperature of the cracking reaction was adjusted to 950 degrees Celsius.

Comparative Embodiment 1

Different from the above EMBODIMENT 1, the 3DP uses a single nozzle for ejecting an ink, the SiC granulation powders, D50=10 μm of SiC unprocessed powders, and a curing agent were mixed for 10 h to obtain raw material powders for 3DP. A mass ratio of the SiC granulation powders to the SiC unprocessed powders was 1:1, a ratio of a total mass of the SiC granulation powders and the SiC unprocessed powders to a mass of the curing agent was 100:0.4. The curing agent was a solution formed by benzenesulfonic acid and water at a mass ratio of 1:1. The ink was a furan resin solution with a solid content of 50 wt %, the raw material powders and the ink were used for the 3DP at a mass ratio of 100:0.5, and a height of each printing layer of the 3DP was 150 μm, thereby obtaining a green body.

Comparative Embodiment 2

Different from the above EMBODIMENT 1, the impregnation-cracking process was omitted, and the green body was directly subjected to reactive sintering.

Comparative Embodiment 3

Different from the above EMBODIMENT 1, D50=150 μm of SiC unprocessed powders and D50=10 μm of SiC unprocessed powders were mixed at a mass ratio of 1:1 for 10 h by dry mixing to obtain raw material powders for 3DP.

Comparative Embodiment 4

Different from the above EMBODIMENT 1, D50=150 μm of SiC unprocessed powders and D50=10 μm of SiC unprocessed powders were mixed at a mass ratio of 1:1 for 10 h by dry mixing to obtain raw material powders for 3DP, the impregnation-cracking process was omitted, and the green body was directly subjected to reactive sintering.

Each SiC ceramic part of EMBODIMENTS 1-16 and COMPARATIVE EMBODIMENTS 1-4 were tested. The quality of the SiC ceramic part was tested by an electronic balance, and the density of the SiC ceramic part was tested by Archimedes' principle of kerosene discharge, with reference to the standard GB/T 25995-2010. The porosity of the SiC ceramic part was tested by Autopore IV 9500 mercury porosimeter produced by the Micromeritics, with reference to the standard GB/T 21650 1-2008. The three-point bending method was used to measure the bending strength of the SiC ceramic part on an universal electronic testing machine, with reference to the standard GB/T 6569-2006, and the single-sided pre-cracked beam (SEPB) method was used to test the fracture toughness of the SiC ceramic part on the universal electronic testing machine, with reference to the standard GB/T 23806-2009. The above test results were shown in the following Table 1.

TABLE 1

| Item | Density ($g/cm^3$) | Porosity (%) | Fracture toughness ($MPa \cdot m^{1/2}$) | Bending strength (MPa) |
|---|---|---|---|---|
| EMBODIMENT 1 | 2.99 | 0.64 | 7.7 | 300 |
| EMBODIMENT 2 | 2.78 | 1.15 | 6.1 | 259 |
| EMBODIMENT 3 | 2.93 | 0.5 | 8 | 290 |
| EMBODIMENT 4 | 2.55 | 4.43 | 4.1 | 190 |
| EMBODIMENT 5 | 2.91 | 0.71 | 7.4 | 278 |
| EMBODIMENT 6 | 2.82 | 1.20 | 6.4 | 269 |
| EMBODIMENT 7 | 2.80 | 1.28 | 6.3 | 266 |
| EMBODIMENT 8 | 2.74 | 1.32 | 6.2 | 263 |
| EMBODIMENT 9 | 2.61 | 2.30 | 4.3 | 195 |
| EMBODIMENT 10 | 2.56 | 2.91 | 4.0 | 180 |
| EMBODIMENT 11 | 3.01 | 0.55 | 8.0 | 310 |
| EMBODIMENT 12 | 2.92 | 0.70 | 6.9 | 288 |
| EMBODIMENT 13 | 2.84 | 0.96 | 6.7 | 279 |
| EMBODIMENT 14 | 2.78 | 1.53 | 6.0 | 270 |
| EMBODIMENT 15 | 2.83 | 0.98 | 6.7 | 275 |
| EMBODIMENT 16 | 2.74 | 1.61 | 6.4 | 263 |
| COMPARATIVE EMBODIMENT 1 | 2.44 | 3.48 | 4.4 | 204 |
| COMPARATIVE EMBODIMENT 2 | 2.62 | 1.85 | 4.2 | 232 |
| COMPARATIVE EMBODIMENT 3 | 2.37 | 4.51 | 3.2 | 180 |
| COMPARATIVE EMBODIMENT 4 | 2.33 | 7.61 | 3.7 | 147 |

According to the Table 1, SiC ceramic parts of EMBODIMENTS 1-4 are prepared through different additives, different powders, different molding conditions, and different sintering conditions. FIGS. 2 to 5 are the metallographic microscope images of the SiC ceramic parts of EMBODIMENTS 1 to 4 respectively, and it can be seen from the images that the sizes and contents of free Si in the SiC ceramic parts prepared by different additives and processes are different. The size and content of free Si are the main factors affecting the fracture strength, and the finer the free Si and the lower the free Si content, the higher the strength of the SiC material. FIGS. 6 to 9 are the SEM images of the SiC ceramic parts of EMBODIMENTS 1 to 4 respectively. It can be seen from the images that free carbon is evenly distributed in the material in a form of dots. The SiC ceramic part of EMBODIMENT 1 almost contain no carbon. The free carbon in the SiC ceramic parts of EMBODIMENTS 2 and 3 is extremely fine, and the distribution continuity of the free carbon is very good. In EMBODIMENT 4, the size of the carbon spot is the largest and the distribution uniformity of the free carbon is poor, so that the mechanical properties of the SiC ceramic part of EMBODIMENT 4 worse than those of EMBODIMENTS 1 to 3.

According to the Table 1, comparing EMBODIMENT 1 with COMPARATIVE EMBODIMENTS 1 to 4 respectively, it was found that compared with dual-nozzle 3DP, the efficiency of the single-nozzle 3DP was greatly reduced, and the curing agent and SiC powder were unevenly mixed, resulting in low strength of the green bodys, low density and low strength of the SiC ceramic parts. Furthermore, the impregnation-cracking process can effectively carburize the green body and improve the strength of the green body. Without the impregnation-cracking carburizing process, the density and strength of SiC ceramic parts will be too low. In addition, the granulation powders can effectively improve the laying performance of the powders. If the large particle raw powders are directly mixed with medium and small particle size powders without granulation, the powders will be easy to cluster when laid out, the density of the green body will be low, and the porosity of the green body will be high. Therefore, the residual silicon content of the sintered SiC ceramic will be high, the density and the strength of the SiC ceramic will be low.

According to the Table 1, comparing EMBODIMENT 1 with COMPARATIVE EMBODIMENTS 5 to 7 respectively, it was found that the increase in the particle size of SiC micron powder leads to a reduction in the density and strength of SiC ceramic products, but the impact is small.

According to the Table 1, comparing EMBODIMENT 1 with COMPARATIVE EMBODIMENTS 8 to 10 respectively, it was found that the addition ratio of the SiC granulation powders has a great influence on the density, the porosity, and the strength of the SiC ceramic products. The particle size of the powder suitable for spreading in the powder bed is 10 μm to 100 μm, and under the premise of satisfying the powder spreading performance, the smaller the particle size of the SiC powder, the better.

According to the Table 1, comparing EMBODIMENT 1 with COMPARATIVE EMBODIMENTS 11 to 13 respectively, it was found that increasing the number of impregnation-cracking times, the carbon content of the green body and the material density can be increased. However, too many impregnation-cracking times will lead to carbon-rich in the green body, which reduces the strength of the green body and the strength of SiC ceramics after sintering.

According to the Table 1, comparing EMBODIMENT 1 with COMPARATIVE EMBODIMENTS 14 to 16 respectively, it was found that the temperature of the cracking reaction has a small impact on the strength of SiC ceramics, but has a greater impact on the density of SiC ceramics. When the temperature of the cracking reaction is too low, the carbonization reaction of phenolic resin is incomplete, the carbon source is insufficient, the degree of reaction sintering is not enough, and the residual silicon content is high, so that the SiC ceramic material will have a low strength. When the temperature of the cracking reaction is too high, as the temperature of the cracking reaction increases, the carbon agglomeration of the green body will occur, which also results in the silicon-carbon reaction not being able to proceed completely, the amount of residual carbon being too high, and the strength of the SiC ceramic material being reduced.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a SiC ceramic part, comprising:

mixing SiC micron powders, nano carbon black and an additive in a solvent to obtain a spray slurry;

performing spray granulation to the spray slurry to obtain SiC granulation powders;

mixing the SiC granulation powders and SiC unprocessed powders to obtain a mixture and printing the mixture by three dimensional printing to obtain a green body;

impregnating the green body in a phenolic resin precursor and performing a cracking reaction to the green body after being impregnated to obtain a compact body, wherein the phenolic resin precursor comprises a phenolic resin and a solvent, the phenolic resin comprises p-tert-butyl phenolic resin, and the solvent in the phenolic resin precursor comprises methanol; and performing reactive sintering to the compact body to obtain the SiC ceramic part.

2. The method for manufacturing the SiC ceramic part of claim 1, wherein a grain size of each of the SiC micron powders is in a range of 1 μm to 5 μm, a grain size of the nano carbon black is in a range of 10 nm to 30 nm, and in the spray slurry, a mass ratio of the SiC micron powders to the nano carbon black is 20:1 to 20:3.

3. The method for manufacturing the SiC ceramic part of claim 1, wherein the additive comprises an adhesive agent, a dispersing agent, and a defoaming agent, and in the spray slurry, a mass ratio of the SiC micron powders to the adhesive agent is 200:1 to 50:1, a mass ratio of the SiC micron powders to the dispersing agent is 200:1 to 200:3, and a mass ratio of the SiC micron powders to the defoaming agent may be 250:1 to 250:3.

4. The method for manufacturing the SiC ceramic part of claim 3, wherein the adhesive agent comprises at least one of propylene with carboxyl, propylene with amino group, dicyanodiamide, and amine organic dispersions, the dispersing agent comprises at least one of polyacrylate, citrate, polyethylene glycol, and tetramethylammonium hydroxide, the defoaming agent comprises at least one of sodium carboxymethyl cellulose, 1-octanol, 1-butanol, and tributyl phosphate, and the solvent is water.

5. The method for manufacturing the SiC ceramic part of claim 1, wherein a solid content of the spray slurry is 30 wt % to 50 wt %.

6. The method for manufacturing the SiC ceramic part of claim 1, wherein a temperature of an inlet of the spray granulation is in a range of 200 degrees Celsius to 300 degrees Celsius, and a temperature of an outlet of the spray granulation is in a range of 120 degrees Celsius to 190 degrees Celsius.

7. The method for manufacturing the SiC ceramic part of claim 1, wherein the SiC granulation powders are spherical, a partical size of each of the SiC granulation powders is in a range of 5 μm to 150 μm.

8. The method for manufacturing the SiC ceramic part of claim 1, wherein a grain size of each of the SiC unprocessed powders is in a range of 10 μm to 50 μm.

9. The method for manufacturing the SiC ceramic part of claim 1, wherein a mass ratio of the SiC granulation powders to the SiC unprocessed powders is 1:1 to 7:1.

10. The method for manufacturing the SiC ceramic part of claim 1, wherein the three dimensional printing uses independent dual nozzles to spray an ink and a curing agent respectively.

11. The method for manufacturing the SiC ceramic part of claim 10, wherein the ink comprises a furan resin solution with a solid content of 48 wt % to 52 wt %, during the 3DP, a ratio of a total mass of the SiC granulation powders and the SiC unprocessed powders to a mass of the ink is in a range of 100:0.5 to 100:1.5.

12. The method for manufacturing the SiC ceramic part of claim 10, wherein the curing agent comprises an aqueous solution of benzenesulfonic acid.

13. The method for manufacturing the SiC ceramic part of claim 12, wherein in the aqueous solution of benzenesulfonic acid, a mass ratio of benzenesulfonic acid to water is 0.5 to 1.5, and during the 3DP, a ratio of the total mass of the SiC granulation powders and the SiC unprocessed powders to a mass of the curing agent is in a range of 100:0.4 to 100:1.2.

14. The method for manufacturing the SiC ceramic part of claim 1, wherein a height of each printing layer of the three dimensional printing is in a range of 10 μm to 150 μm.

15. The method for manufacturing the SiC ceramic part of claim 1, wherein a mass ratio of the phenolic resin to the methanol is in a range of 1:1 to 3:1.

16. The method for manufacturing the SiC ceramic part of claim 1, wherein the green body is impregnated in the phenolic resin precursor for 10 h to 20 h.

17. The method for manufacturing the SiC ceramic part of claim 1, wherein a temperature of the cracking reaction is in a range of 600 degrees Celsius to 900 degrees Celsius, and a duration of the cracking reaction is in a range of 1 h to 3 h.

18. The method for manufacturing the SiC ceramic part of claim 1, wherein the green body is impregnated once and the cracking reaction is performed once as one repetition cycle, and a total of 1 to 3 repetition cycles are performed to obtain the compact body.

19. The method for manufacturing the SiC ceramic part of claim 1, wherein a temperature of the reactive sintering is in a range of 1500 degrees Celsius to 1900 degrees Celsius, and a duration of the reactive sintering is in a range of 0.5 h to 5 h.

* * * * *